US011030806B2

(12) United States Patent
Bretschneider et al.

(10) Patent No.: US 11,030,806 B2
(45) Date of Patent: Jun. 8, 2021

(54) COMBINED VIRTUAL AND PHYSICAL ENVIRONMENT

(71) Applicant: VR Exit LLC, Fort Lauderdale, FL (US)

(72) Inventors: Ken Bretschneider, Pleasant Grove, UT (US); Curtis Hickman, Pleasant Grove, UT (US); James Jensen, American Fork, UT (US)

(73) Assignee: VR Exit LLC, Fort Lauderdale, FL (US)

( * ) Notice: Subject to any disclaimer, the term of this patent is extended or adjusted under 35 U.S.C. 154(b) by 0 days.

(21) Appl. No.: 14/942,878

(22) Filed: Nov. 16, 2015

(65) Prior Publication Data

US 2016/0275722 A1      Sep. 22, 2016

Related U.S. Application Data

(60) Provisional application No. 62/080,307, filed on Nov. 15, 2014, provisional application No. 62/080,308, filed on Nov. 15, 2014.

(51) Int. Cl.

| | |
|---|---|
| *G06T 19/00* | (2011.01) |
| *G09B 9/00* | (2006.01) |
| *G06F 3/01* | (2006.01) |
| *A63F 13/69* | (2014.01) |
| *A63F 13/285* | (2014.01) |
| *A63F 13/323* | (2014.01) |
| *A63F 13/212* | (2014.01) |
| *A63F 13/327* | (2014.01) |
| *A63F 13/428* | (2014.01) |

(52) U.S. Cl.
CPC .......... *G06T 19/006* (2013.01); *A63F 13/212* (2014.09); *A63F 13/285* (2014.09); *A63F 13/323* (2014.09); *A63F 13/327* (2014.09); *A63F 13/428* (2014.09); *A63F 13/69* (2014.09); *G06F 3/011* (2013.01); *G09B 9/00* (2013.01)

(58) Field of Classification Search
CPC combination set(s) only.
See application file for complete search history.

(56) References Cited

U.S. PATENT DOCUMENTS

| | | | |
|---|---|---|---|
| 5,633,742 | A | 5/1997 | Shipley |
| 6,069,583 | A | 5/2000 | Silvestrin et al. |
| 6,073,489 | A | 6/2000 | French et al. |
| 6,430,997 | B1 | 8/2002 | French et al. |
| 7,269,632 | B2 * | 9/2007 | Edeker .............. H04L 29/12066 709/201 |
| 9,132,342 | B2 * | 9/2015 | Balachandreswaran .................... A63F 13/00 |
| 9,159,152 | B1 | 10/2015 | Glover et al. |

(Continued)

OTHER PUBLICATIONS

Nescher et al., "Planning Redirection Techniques for Optimal Free Walking Experience using model Predictive Control", 2014 IEEE Symposium on 3D User Interface, Mar. 29-30, 2014, pp. 111-118.

(Continued)

*Primary Examiner* — Motilewa Good Johnson
(74) *Attorney, Agent, or Firm* — Sunstein LLP

(57) ABSTRACT

In part, the disclosure related to systems and methods of merging a simulation experience with physical objects and sensory stimuli generated outside of the simulation in a controlled physical environment to enhance the simulated experience.

8 Claims, 14 Drawing Sheets

(56) References Cited

U.S. PATENT DOCUMENTS

| | | | |
|---|---|---|---|
| 9,286,711 B2* | 3/2016 | Geisner | G06F 3/013 |
| 9,364,746 B2 | 6/2016 | Chudley et al. | |
| 9,721,386 B1* | 8/2017 | Worley, III | G06T 19/006 |
| 9,767,720 B2* | 9/2017 | Kinnebrew | G09G 3/003 |
| 10,137,376 B2* | 11/2018 | Kohler | H04N 21/4402 |
| 10,311,679 B2* | 6/2019 | Washington | G07F 17/3244 |
| 2003/0071733 A1 | 4/2003 | Hall et al. | |
| 2003/0077556 A1 | 4/2003 | French et al. | |
| 2006/0017654 A1* | 1/2006 | Romo | G06F 3/01 |
| | | | 345/7 |
| 2006/0088081 A1 | 4/2006 | Withington et al. | |
| 2006/0211462 A1 | 9/2006 | French et al. | |
| 2006/0287025 A1 | 12/2006 | French | |
| 2007/0031148 A1 | 2/2007 | Li et al. | |
| 2007/0066403 A1 | 3/2007 | Conkwright | |
| 2009/0028258 A1 | 1/2009 | Ma et al. | |
| 2009/0187389 A1* | 7/2009 | Dobbins | G06F 3/011 |
| | | | 703/6 |
| 2010/0261527 A1 | 10/2010 | Steiner et al. | |
| 2010/0287500 A1* | 11/2010 | Whitlow | G02B 27/01 |
| | | | 715/810 |
| 2011/0090065 A1 | 4/2011 | Overhultz et al. | |
| 2011/0281638 A1 | 11/2011 | Bansi et al. | |
| 2012/0021825 A1 | 1/2012 | Harp et al. | |
| 2012/0142415 A1* | 6/2012 | Lindsay | G06T 19/006 |
| | | | 463/33 |
| 2012/0249741 A1* | 10/2012 | Maciocci | G06T 15/503 |
| | | | 348/46 |
| 2012/0307943 A1 | 12/2012 | Umeda et al. | |
| 2013/0116046 A1 | 5/2013 | Manton et al. | |
| 2013/0225305 A1* | 8/2013 | Yang | A63F 13/00 |
| | | | 473/152 |
| 2013/0260896 A1 | 10/2013 | Miura et al. | |
| 2014/0179428 A1 | 6/2014 | Miura et al. | |
| 2014/0254466 A1 | 9/2014 | Wurster et al. | |
| 2015/0262208 A1* | 9/2015 | Bjontegard | G06Q 30/0205 |
| | | | 705/7.31 |
| 2015/0278263 A1* | 10/2015 | Bowles | A63F 13/219 |
| | | | 463/43 |
| 2016/0026253 A1* | 1/2016 | Bradski | G02B 27/225 |
| | | | 345/8 |
| 2016/0041391 A1* | 2/2016 | Van Curen | G02B 27/0172 |
| | | | 345/633 |
| 2016/0048787 A1 | 2/2016 | Kaminsky et al. | |
| 2016/0292924 A1* | 10/2016 | Balachandreswaran | |
| | | | G06T 19/006 |
| 2017/0235848 A1* | 8/2017 | Van Dusen | G06F 16/904 |
| | | | 705/12 |

OTHER PUBLICATIONS

PCT Application No. PCT/US2017/038000 International Search Report and Written Opinion dated Jul. 6, 2017.

Steinicke et al., "Estimation of detection thresholds for redirected walking techniques", IEEE Transactions on Visualization and Computer Graphics, Jan./Feb. 2010, vol. 16, No. 1, pp. 17-27.

C. Neth, et al., "Velocity-dependent curvature gain and avatar use for Redirected Walking", Joint Virtual Reality Conf. of EuroVR-EGVE-VEC (2010), pp. 1-2 (Year: 2010).

E.A. Suma, Z. Lipps, S. Finkelstein, D. 'M. Krum and M. Bolas, "Impossible Spaces: Maximizing Natural Walking in Virtual Environments with Self-Overlapping Architecture," IEEE Trans. Vis. Comput. Graphs., vol. 18, No. 4 pp. 555-564, 2012 (Year: 2012).

Eric Hodgson and Eric Bachmann, "Comparing Four Approaches to Generalized Redirected Walking: Simulation and Live User Data", IEEE Transactions on Visualization and Computer Graphics, vol. 19, No. 4, Apr. 2013, pp. 634-643. (Year: 2013).

Final Office Action from U.S. Appl. No. 15/183,839, dated Dec. 19, 2018, 37 pages.

Final Office Action from U.S. Appl. No. 15/183,839, dated Oct. 11, 2017, 62 pages.

Final Office Action from U.S. Appl. No. 15/624,716, dated Feb. 15, 2019, 29 pages.

Final Office Action, U.S. Appl. No. 15/183,839, dated Jan. 9, 2020, 46 pages.

Matsumoto, et. al, "Unlimited Corridor: Redirected Walking Techniques using Visuo Haptic Interaction", SIGGRAPH '16 Emerging Technologies, Jul. 24-28, 2016, Anaheim CA, ACM978-1-4503-4372-5/16/07, pp. 1-2 (Year: 2016).

MPIVideoProject, "Using Avatars for Redirected Walking", Youtube video, published Apr. 14, 2011, pp. 1-2, at https://www.youtube.com/watch?v=Xm1 LrQ32kDg (Year: 2011).

Non-final Office Action from U.S. Appl. No. 15/068,567, dated Jan. 12, 2018, 19 pages.

Non-final Office Action from U.S. Appl. No. 15/068,568,dated Jan. 12, 2018, 22 pages.

Non-final Office Action from U.S. Appl. No. 15/183,839, dated Jun. 5, 2018, 21 pages.

Non-final Office Action from U.S. Appl. No. 15/183,839, dated Mar. 22, 2017, 24 pages.

Non-final Office Action from U.S. Appl. No. 15/624,716, dated Jul. 27, 2018, 13 pages.

Non-Final Office Action, U.S. Appl. No. 15/183,839, dated Aug. 8, 2019, 48 pages.

Notice of Allowance, U.S. Appl. No. 15/624,716, dated Dec. 18, 2019, 9 pages.

Razzaque S., "Redirected Walking," Doctoral Dissertation, University of North Carolina, Chapel Hill, 2005, 202 pages.

Razzaque, S., Kohn, Z., & Whitton, M. C., "Redirected walking", Proceedings of Eurographics, vol. 9, Sep. 2001, pp. 105-106 (Year 2001).

Walker, James, Redirected Walking in Virtual Environments. Michigan Technological University, 2013, pp. 1-12 at https:// pdfs.semanticscholar.org/6dac/eaebf0bc569621163ea15ff166c3f05b3c00.pdf (Year 2013).

\* cited by examiner

N User- Multiuser Small Foot Print Modular Array Stackable – Linkable Pods

Curved Walls / Circular Room of a Pod or Pod Component with Responsive and Time Changing Zones and Modular Interaction Elements Immersive Play Space / Pod for User
Movement and Interactions Multiple Curved Regions Connected
for Environmental Transitions Modular Interaction Element In Game View Overlaid on Modular
Interaction Element

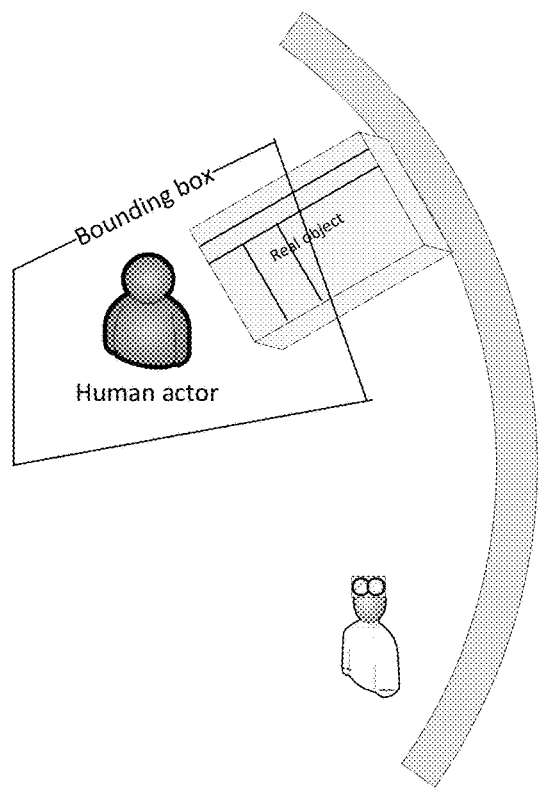
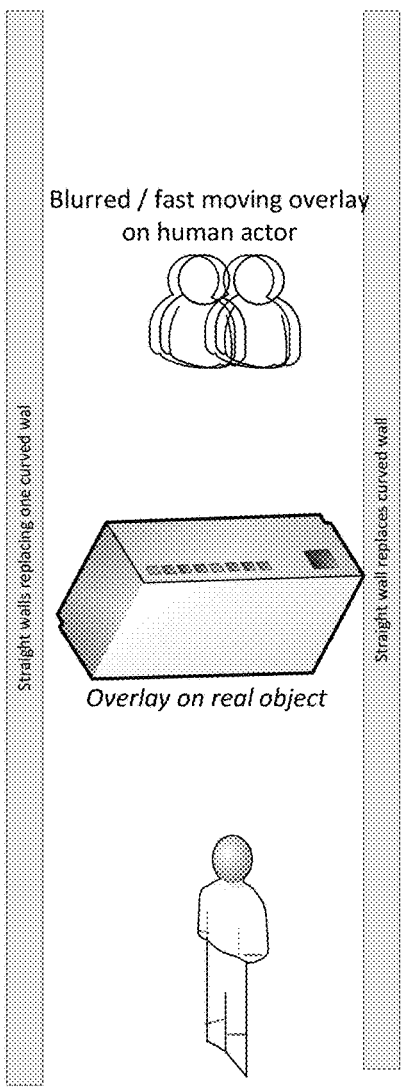
Figure 8A
Figure 8B

COMBINED VIRTUAL AND PHYSICAL ENVIRONMENT

BACKGROUND

This disclosure relates to systems and methods that may be used to create simulations such as virtual environments that can be combined with physical environments such as pods. Users can interact with a pod and its components in various ways. In part, the present disclosure relates to systems in which users may participate in an environment with other users through a combination of physical and virtual interactions. Such systems may utilize a variety of tracking technologies, audio and visual technologies, physical environments, and other features to provide a polysensory experience to participants. In one embodiment, a modular arrangement of pods or other physical locations are used to increase throughput of multiple users participating in a simulation of over time.

BRIEF DESCRIPTION OF THE DRAWINGS

Non-limiting and non-exhaustive embodiments of the disclosure are described, including various embodiments of the disclosure with reference to the figures, in which:

FIG. 8A illustrates a user walking in a pod with a person in the pod and the object of FIG. 7A according to embodiments of the present disclosure.

FIG. 8B illustrates the user's experience in the simulation as they walk toward a control panel overlaid on the object of FIG. 8A and the modified in simulation appearance of the person from FIG. 8A according to embodiments of the present disclosure.

DETAILED DESCRIPTION

Figure 1A:
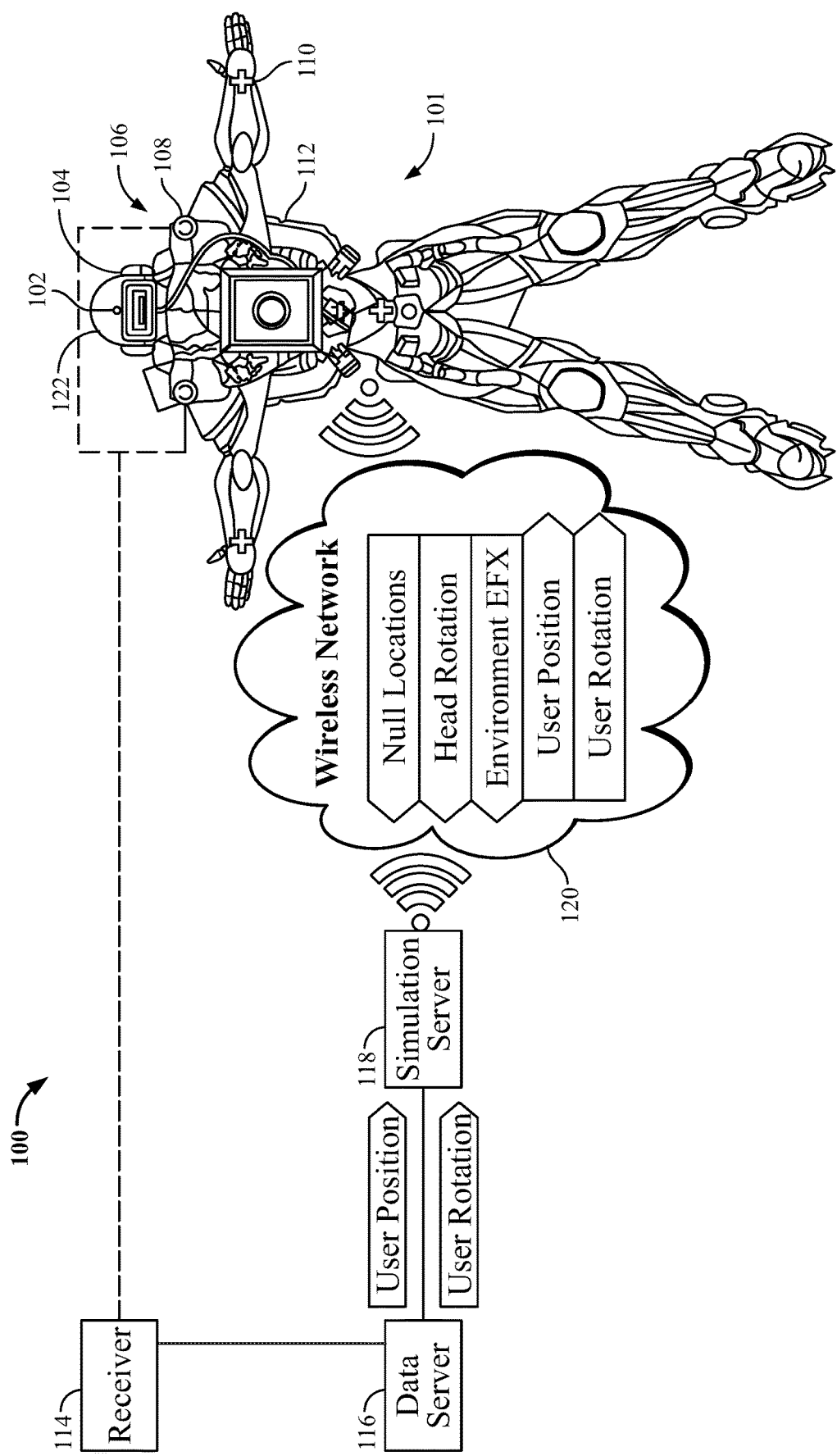
FIG. 1A illustrates an example of an embodiment of a functional block diagram of a system for creating an immersive environment according to embodiments of the present disclosure.

Disclosed herein are various embodiments of systems and methods that may be used to create an immersive environment in which users may experience a combination of virtual and physical interactions. As a result of the combination, a simulated experience is enhanced through the physical space, such as a pod, in which the user engages in the simulation. The immersive environments disclosed herein may be used in connection with a variety of types of activities (e.g., gaming, storytelling, etc.), training (e.g., military or law enforcement training), and education (e.g., creating virtual representations of famous museums or locations). Systems and methods consistent with the present embodiment interact with many of the user's senses, to enhance the user's experience interaction with the environment. Embodiments consistent with the present disclosure may provide a combination of simulated and real audio and visual information, while allowing the user to have physical mobility. The geometry of the pods can be used to enhance this mobility and user perceptions.

A physical environment may be controlled to reinforce elements of the virtual environment. In various embodiments, a specifically designed physical stage may be used such as pod which includes without limitation a room, arrangement of walls or panels, or other delineated spaces. Users may be permitted to creep, walk, run, crouch and crawl while interacting with both the physical stage or pod and the virtual environment. A pod may include elevation changes, vibration, air pressure changes, directed temperature sensations, simulated liquids, smells, etc. FIGS. 4 to 6B show various physical location or pod embodiments. The combination of cues from the physical environment may create an immersive experience, including the virtual environment, for a user by involving many, if not all, of the user's senses.

In various embodiments, in addition to experiencing mobility and interactivity within a physical environment and a virtual environment, users may also interact with physical human actors/avatars. A real human actor is shown in FIG. 8A with the user wearing a virtual reality device not being able to see the real actor. Human actors may play the role of key characters within an experience. As shown, in FIG. 8B, in the simulation the human actor's appearance is blurred and appears to be vibrating or moving quickly. Also, a real object, which can be caused to appear in the pod by a control signal triggered by tracking the user which causes a panel to slide on the floor or wall and position the object in the user's path. The real object can have a texture to reinforce the reality of the overlay for the object shown in FIG. 8B.

In order to facilitate interaction with users, actors may be equipped with a special headset with visuals of both the physical and virtual environment. In some embodiments, the human actors may serve as a beacon for a virtual character. The panels of the pod can also be textured and replaced on a per simulation basis in a modular way—such as with fake plants for a jungle adventure or pipes for a space adventure Further, in some embodiments, a bounding box may be associated with an actor. When users are outside of the bounding box, a virtual representation may be controlled by the system, but when users enter the bounding box, the actor may take over the actions of the character and become physical. Interactions between participants and actors can range widely from intelligent conversation to physical interaction or confrontation.

FIG. 1A illustrates an example of an embodiment of a functional block diagram of a system 100 for creating an immersive environment according to embodiments of the present disclosure. In various embodiments, system 100 may include a variety of technologies operating in concert to create an immersive environment consistent with the present disclosure. VR headsets, VR goggles, projectors, displays, game consoles, motion trackers, and other technologies can be use to provide an immersive experience. Certain components of system 100 may be carried by a user 101 such as wearable backpack, while other components may be stationary.

Communication between the components carried by the user and the stationary components may be accomplished by a wireless network 120. In various embodiments, wireless network 120 may be embodied using a variety of technologies, including any of the 802.11 networking standards, ultra-wide band (UWB), and the like. Additional details relating to server applications and clients applications are described with regard to FIG. 9.

A user-worn system 112 may be configured to generate representations of the physical environment and the virtual environment generated by system 100. As described in greater detail below, the user-worn system may comprise a computing platform specifically configured for operation within system 100. The computing platform may be configured to generate visual and auditory or vibratory representations of the environment and to communicate through wireless network 120 with a simulation server 118 and/or data server 116. Further, the computing platform may be configured to receive input from various peripheral devices, which are described in greater detail below.

The user 101 may wear a helmet, goggles, or headset 122 that may comprise an audio-visual system and/or a transducer array for force feedback. The audio-visual system may include a display component 102 and an audio component 104 controlled by the user-worn system 112. In various embodiments, the display component 102 may entirely obscure a user's vision and generate a complete stereoscopic three dimensional visual representation. In other embodiments, the display component 102 may be a combination of the physical environment and virtual overlays.

In one embodiment, the display component 102 may comprise an Oculus Rift headset, available from Oculus VR, LLC of Irvine, Calif. The Oculus Rift headset uses a low persistence OLED display to eliminate motion blur and judder, two of the biggest contributors to simulator sickness. Low persistence also makes the scene appear more visually stable, increasing the potential for presence. The high-definition 960×1080 per-eye display reduces the screen-door effect and improves clarity, color, and contrast. The Oculus Rift headset also integrates precise, low-latency positional head tracking using an external camera that allows a user to move with 6-degrees-of-freedom. The audio component 104 may be configured to generate an immersive sound experience, which may include sounds from both the physical environment and the virtual environment. Sounds from the physical environment may include speech from other users of system 100.

The helmet, goggles or headset 122 may also include a local tracking system 106 configured to track the user's extremities. The local tracking system 106 may aid in correctly rendering the position of the user's arms and legs in the virtual environment. In some embodiments, the local tracking system may be configured to track the user's extremities (e.g., arms, legs, fingers) using optical detection. Further, the local tracking system 106 may also be configured to track a user's gestures. Gestures may be used in various embodiments for interacting with the virtual environment. For example, a specific gesture may result in a corresponding action in the virtual environment (e.g., a throwing gesture may result in the virtual system generating a representation of an object being thrown, even though no physical object was actually thrown).

In some embodiments, markers 110 may be disposed on a user's arms or hands to aid in the tracking performed by local tracking system 106. In one specific embodiment, the local tracking system 106 may comprise a Leap Motion Controller available from Leap Motion, Inc., of San Francisco, Calif.

An environmental tracking system 108 may be configured to identify the location of a user within the physical environment. The user's position may be monitored by one or more receivers 114. In various embodiments, a physical environment may include a large number of receivers placed throughout a physical environment where system 100 is used. The environmental tracking system 108 may be configured to provide three-dimensional position information for the user 101. In the illustrated embodiment, the environmental tracking system 108 includes two components, one disposed on each shoulder of the user 101. In addition to permitting tracking in three dimensions, the two components may also provide a determination of the user's orientation and rotation.

Optical tracking techniques and motion capture are known for animating character models in two or three dimensions, and similar systems may also be used in various embodiments consistent with the present disclosure. Further, in one embodiment, the environmental tracking system 108 and receiver 114 may comprise active Radio Frequency Identification (RFID) tags and RFID receivers, respectively. The position of the RFID receivers may be programmed into a data server 116, and the proximity of RFID tags on the user 101 to the receivers 114 may be analyzed to determine the user's position, speed, rotation, orientation, etc.

The user's position and rotation may be provided by the data server 116 to a simulation server 118. Further, the user position and user rotation may be transmitted via the wireless network to the user-worn components and used to generate the appropriate information on the display component 102 based on the user's position. The data server 116 may also contain information about the location of physical features in the physical environment (e.g., walls, props, etc.) and may determine a user's proximity to the physical features. The user's proximity to such physical features may be used in creating a seamless presentation of the physical environment and the virtual environment. As shown in FIG. 8B, proximity detection and overlays can be used in conjunction with physical elements in a pod to transform the user experience.

In another embodiment, the environmental tracking system 108 may comprise an electromagnetic tracking system. An electromagnetic tracking system may be configured to measure magnetic fields generated by running an electric current through a plurality of coiled wires arranged in a orientation relative to one another such as perpendicularly or at specified angle. In one embodiment, the wires are multiplexed sequentially or in a pattern to generate fields which can be detected and tracked. Three wires are used in one embodiment. Each small coil acts as an electromagnet, and corresponding sensors may measure how the magnetic field affects the other coils. This measurement tells the system the direction and orientation of the emitter. One electromagnetic tracking system that may be used in various embodiments is the $G^4$ system available from Polhemus, of Colchester, Vt.

In still other embodiments, the environmental tracking system 108 may use a Bluetooth® tracking system. One Bluetooth®-based system that may be used in various embodiments is the iBeacon system available from Apple, Inc., of Cupertino, Calif. Transducers in the floor of a pod can also detect weight changes and locate the user spatially and detect jumps and other movement. Light beams and the breakage of such beams arranged in a grid in panels of a pod also facilitate high level user movement tracking.

In other embodiments, other forms of motion and/or position tracking systems may be used in connection with environmental tracking system 108. Use of an environmental tracking system, such as an RFID system or an electromagnetic tracking system, may help to keep latency associated with system 100 below a user's perception threshold. Combinations of tracking technologies may also be used. For example, users may be tracked using a magnetic tracking technology, while moveable objects (e.g., a barrel or other prop) may be tracked using a RFID tracking technology. Mechanical triggers, tripwires, weight sensors, light beams, and other detectors and transducers can also be used to trigger events or provide the sensory stimuli to a user engaged in a simulation in a pod or other location.

The simulation server 118 may be configured to receive information from the user-worn system 112 and to use such information to permit the user 101 to interact with the virtual environment. For example, the simulation server 118 may provide information regarding the null locations, the user's head rotation, and environmental effects. Tracking data is used to drive 3D null objects within a virtual environment such as a simulation to control translation, position, rotation of hierarchical objects and IK bone structures within 3D avatars and objects in the game. In one embodiment, translations of null objects are calculated at the local game computer and then sent to the game server via wireless connection and updated for all other players in the game. Such information may be used to facilitate interaction between multiple users concurrently engaging with system 100.

Figure 1B:
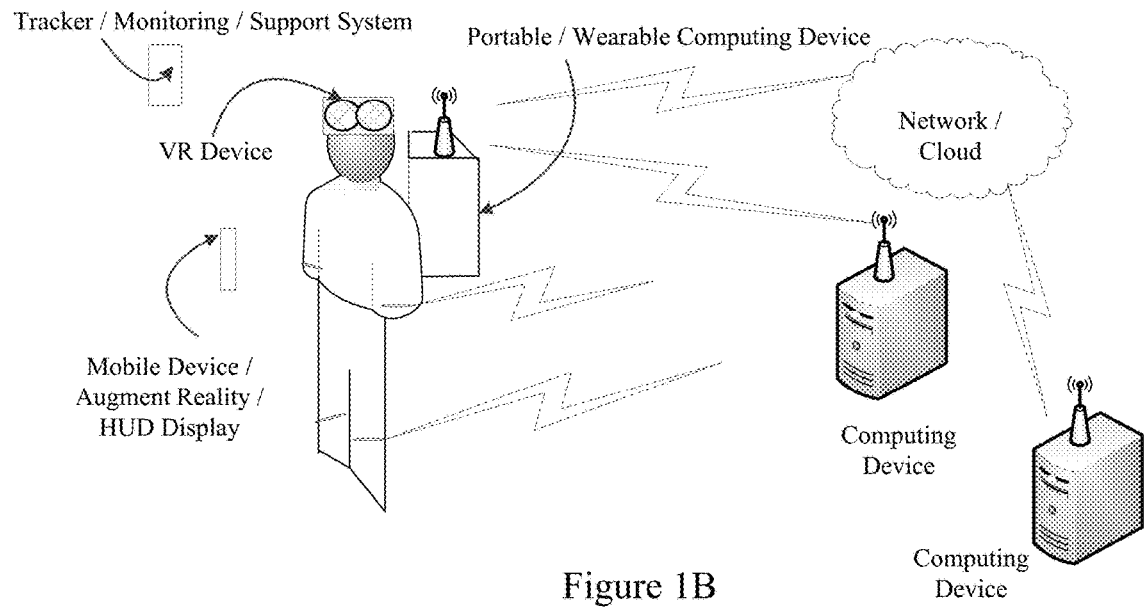
FIG. 1B illustrates a user with various wearable devices and monitoring devices participating in a simulation and exchange data relating thereto according to embodiments of the present disclosure.
Figure 9:
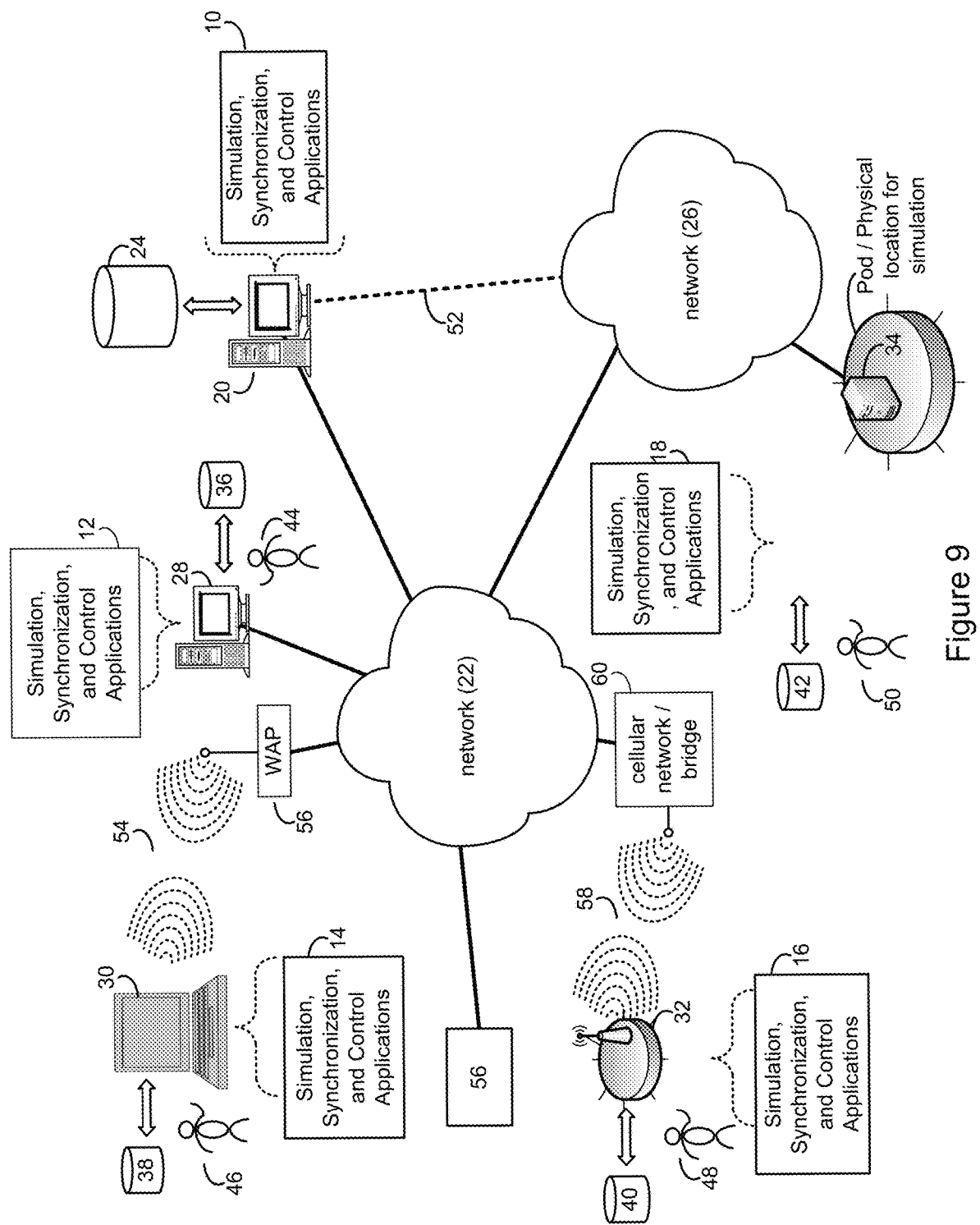
FIG. 9 illustrates an example of system suitable for networking multiple client devices and a server to create an immersive environment for multiple users in the same or different locations or pods according to embodiments of the present disclosure.

The simulation server 118 and the user-worn system 112 may be configured to generate a variety of virtual environments. The simulation server or other computing devices can also be configured to run various applications such as one or more of simulation, synchronization, and control applications. User tracking, support and other applications can also be run. User identification and other software applications can also be used. In some embodiments, the virtual embodiments may be overlaid on the same physical environments. Thus, they can be overlaid on a panel, wall or other object including in a pod for a particular simulation. In one embodiment, the coupling of real objects and simulation objects and locations allow the same physical location to serve as a training area for law enforcement in one simulation, and to serve as a fantasy world in another simulation. The walls, panels and floors of a given pod or other physical location can be configured to slide, open or move such that objects can be added, removed or changed in a synchronized manner relative to the events in the simulation. FIG. 1B shows a user with a backpack or other wearable computing device suitable for running a simulation. A mobile device can also be used to provide an augmented reality experience or as a second screen for use in some simulations. Various tracking devices transmit wireless signals as shown to computing devices which are networked to suitable servers as shown in FIG. 1A, FIG. 9 and as described herein.

Figure 1C:
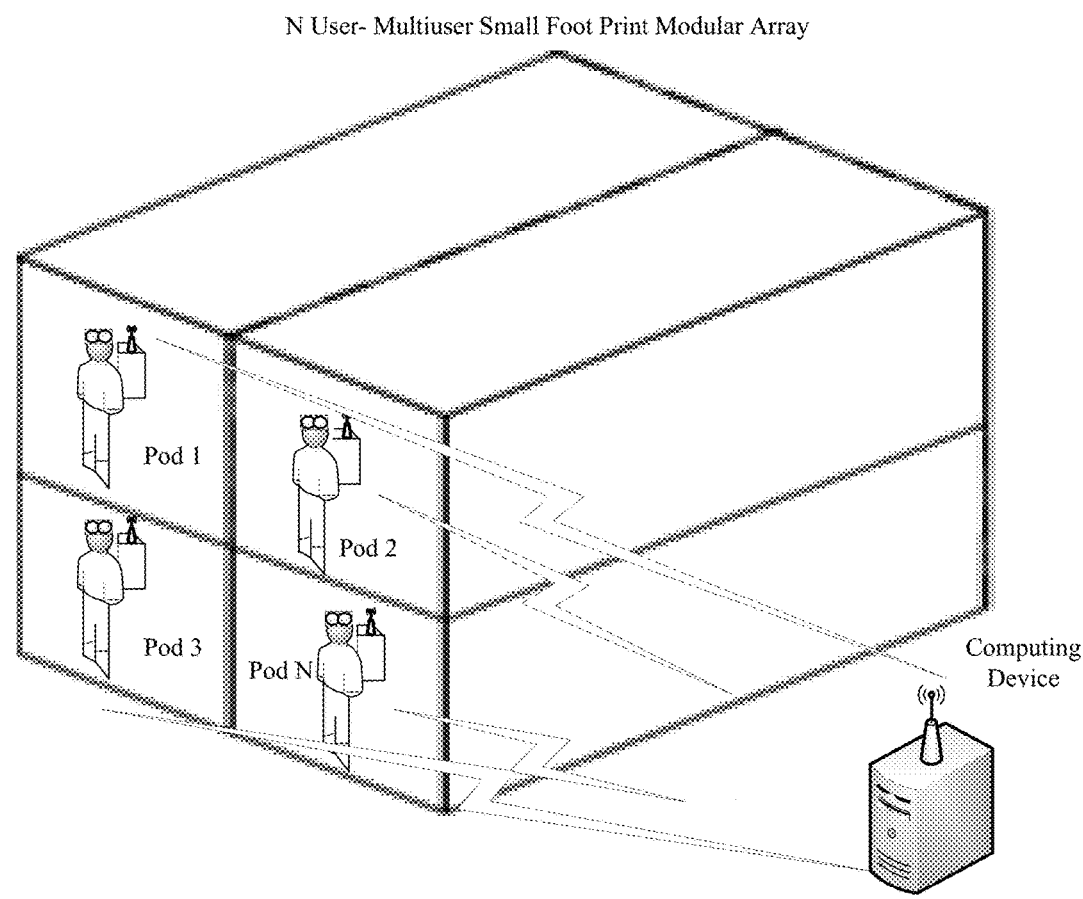
FIG. 1C illustrates an arrangement of pods each having a portal to receive users 1 to N such that physical location space for a combined virtual and simulated environment is reduced and user throughput through the simulation is increased according to an embodiment of the present disclosure.

FIG. 1C illustrates an arrangement of pods each having a portal to receive users 1 to N such that the space needed at a facility for a combined virtual and simulated environment is reduced and user throughput through the simulation is increased. Throughput increases because multiple users can participate in the simulation simultaneously and then exit and allow others to then participate in the next interaction of the simulation. The N users can all participate in the same or different simulations. When used in an amusement park configuration, this configuration avoids bottlenecks and increases user satisfaction and profitability. This arrangement of pods with modular panels and objects can be used with the sensory stimulating devices and other features described herein to merge a real world environment with a simulation while reducing the space needed.

Figure 2B:
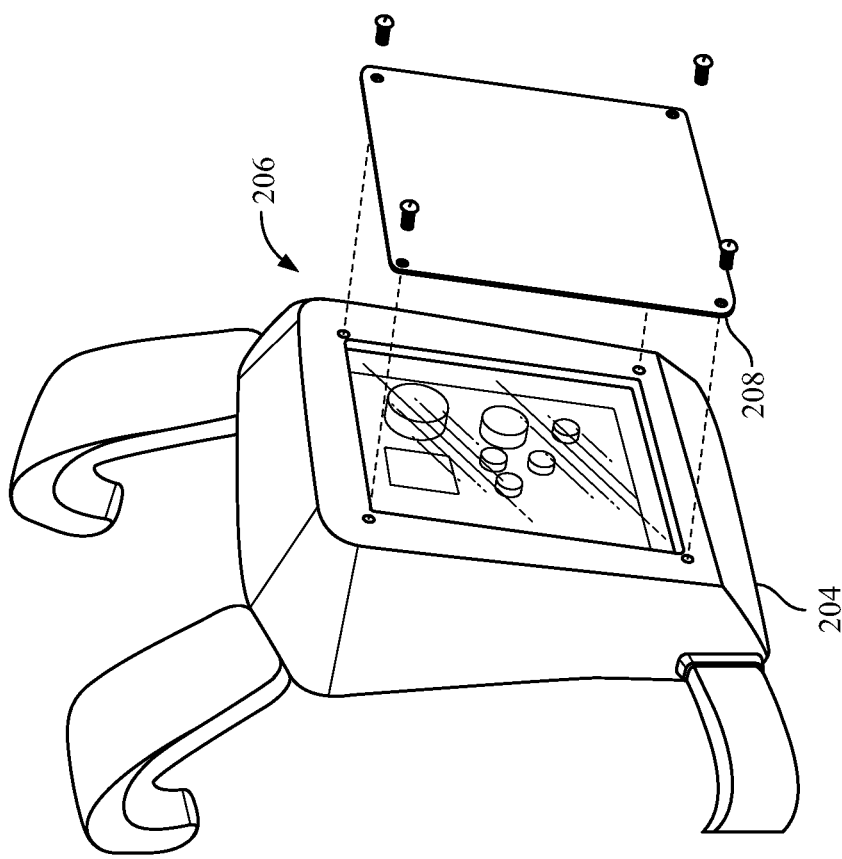
FIG. 2B illustrates a back view of an exemplary configuration of a vest and backpack combination configured to hold a user-worn system configured for use in an immersive environment according to embodiments of the present disclosure.
Figure 2A:
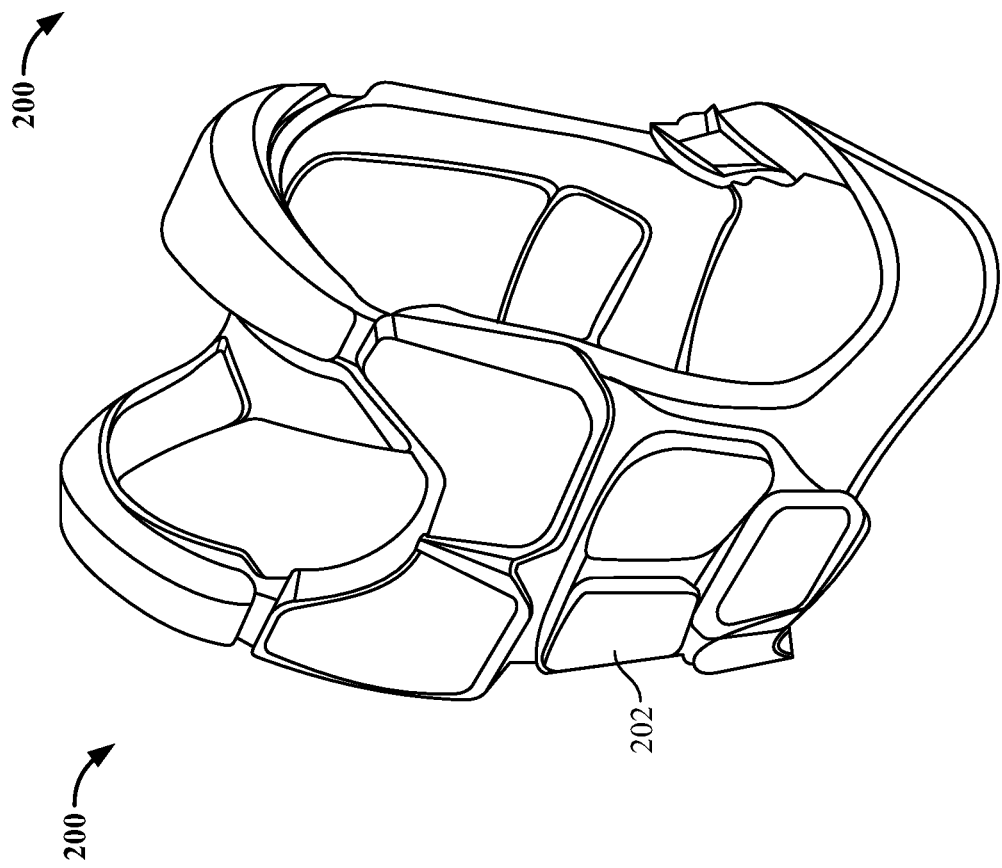
FIG. 2A illustrates a front view of an exemplary configuration of a vest and backpack combination configured to hold a user-worn system configured for use in an immersive environment according to embodiments of the present disclosure.

FIG. 2A illustrates a front view of an exemplary configuration of a vest and backpack combination 200 configured to hold a user-worn system configured for use in an immersive environment according to embodiments of the present disclosure. The vest 202 may be configured to aid in the distribution of weight of the vest and backpack combination 200. The vest and backpack combination may be configured to facilitate the carrying of all of the components necessary for a user to participate in an immersive environment consistent with the present disclosure.

FIG. 2B illustrates a back view of an exemplary configuration of a vest and backpack combination configured to hold a user-worn system configured for use in an immersive environment according to embodiments of the present disclosure. The backpack 204 may include a compartment 206 configured to hold a user-worn system for use in an immersive environment. The compartment 206 may house a computing platform configured to generate visual and auditory representations of the environment and to communicate with other components. The compartment 206 may be designed to protect the components from shock or damage during use. A removable panel 208 may permit access to the compartment 206.

Figure 3:
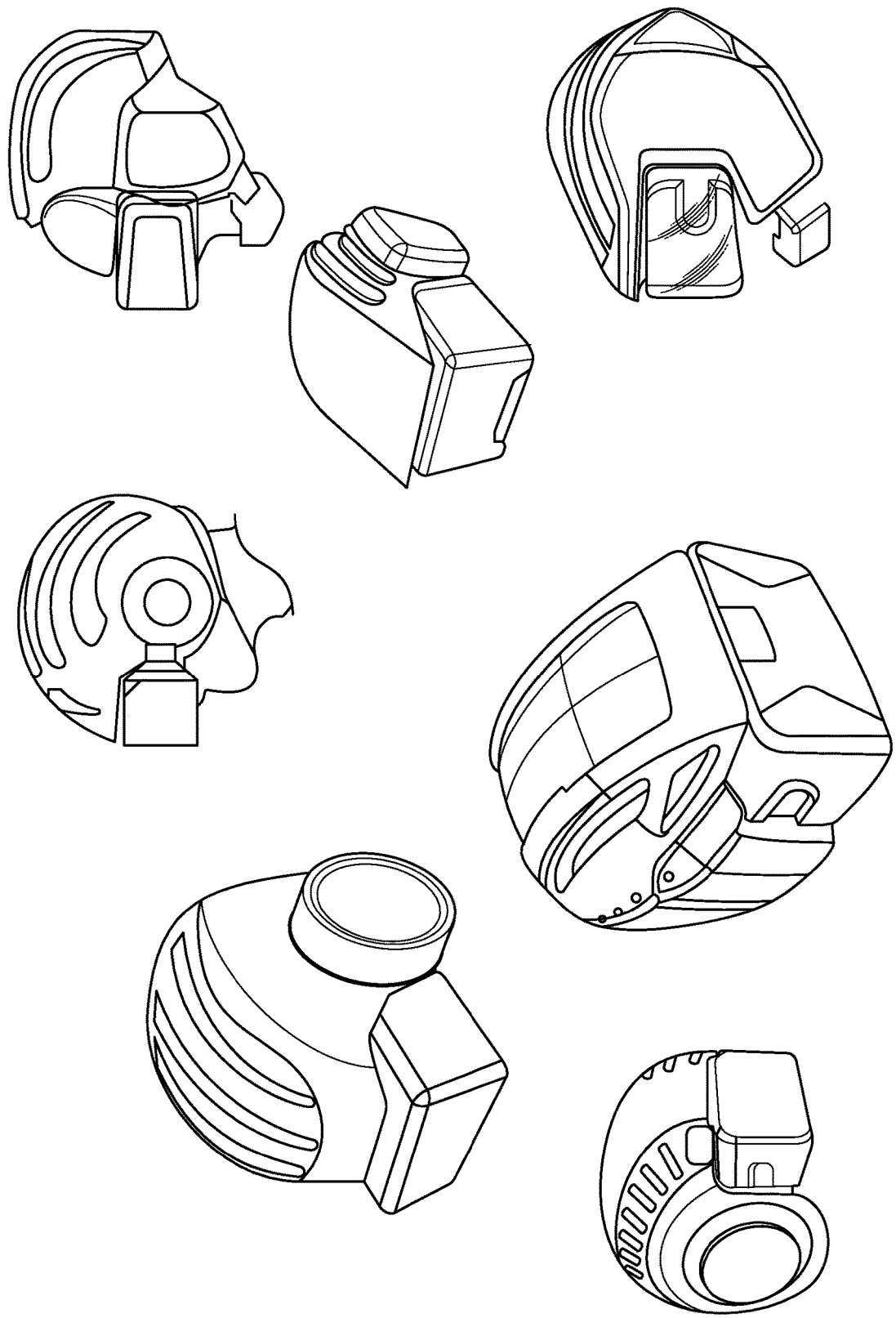
FIG. 3 illustrates a plurality of helmet designs that may be worn by users participating an in immersive environment according to embodiments of the present disclosure.

FIG. 3 illustrates a plurality of helmet designs that may be worn by users participating in an immersive environment according to embodiments of the present disclosure. The helmets illustrated in FIG. 3 may each comprise an audio-visual system. The audio-visual system may include a display component and an audio component, which may cooperate to create an immersive environment according to embodiments of the present disclosure. In various embodiments, the display component may entirely obscure a user's vision and generate a complete stereoscopic three dimensional visual representation. In other embodiments, the display component may be a combination of the physical environment and virtual overlays.

Figure 4:
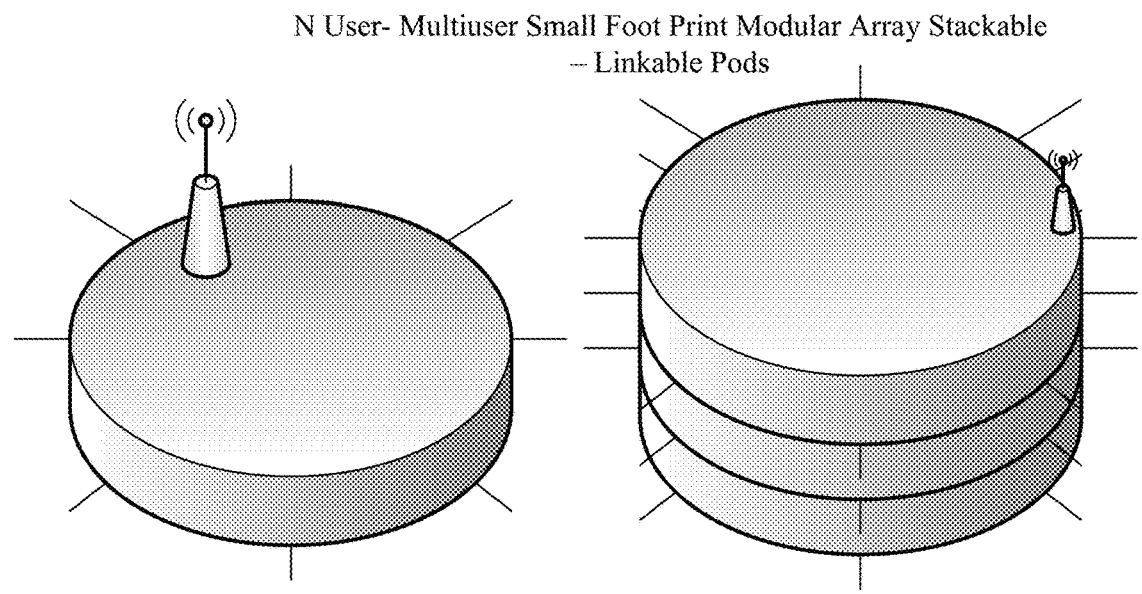
FIG. 4 illustrates various configurations of cylindrical pods which can be use to a host a user during a simulation and present real world objects synchronized with a simulation and a stackable pod configuration for multiple users.

FIG. 4 shows how the physical location for the simulation for a user can be a circular or cylindrical shape. In one embodiment, a cylindrical pod can be stacked with other pods to allow multiple users to be engaged in a simulation in the same area such that the amount of space and throughput for users can be managed based on space and user demand. Many users can enter a pod, participate in a simulation and then depart in an accelerated manner. As a result, clusters of pods facilitate user participation at entertainment venues.

Figure 5:
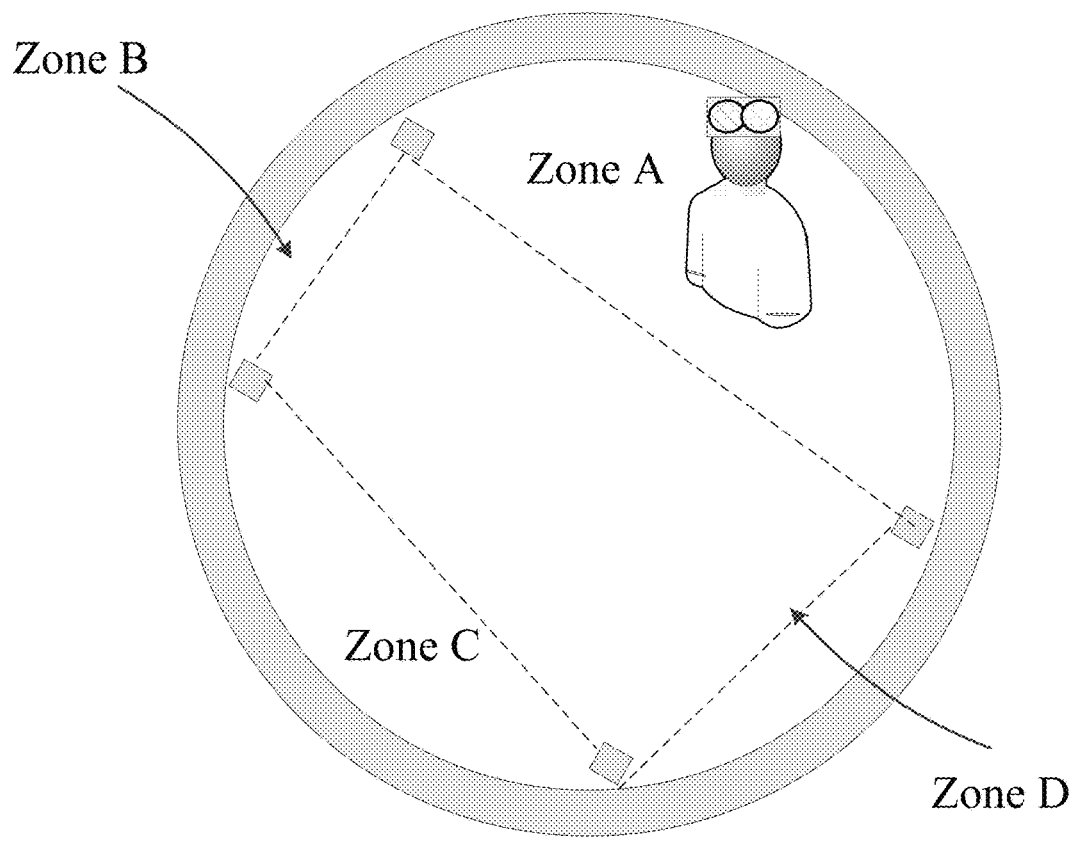
FIG. 5 illustrates an interior view of a pod having a curved wall or panels forming a wall suitable for having different interaction zones such that the simulation changes as the user moves through various zones according to an embodiment of the present disclosure.

FIG. 5 shows the interior of a pod with various interaction zones (zones A to D). A user can traverse the curved wall and believe they are walking though different environments (based on what is presented to them in-simulation) and simulation events can change over time as they enter the different zones. One zone can be hot for a lava simulation and then cold for an artic adventure and change all within one simulation session. The curved geometry can also be used to create a sense of walking over longer distances and allow a small pod to be used to simulate a vast expanse.

Figure 6A:
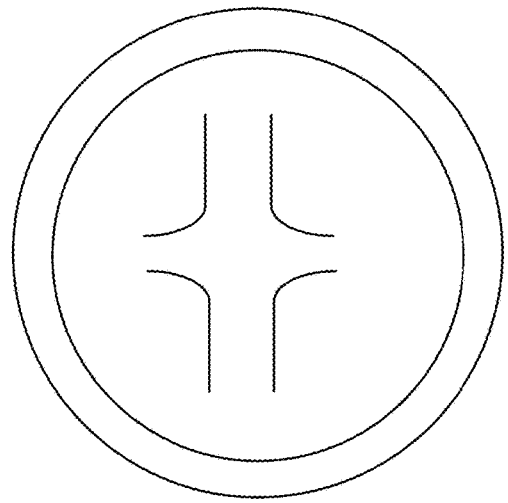
FIGS. 6A and 6B illustrates different pod configurations suitable for use in an immersive environment according to embodiments of the present disclosure.
Figure 6B:
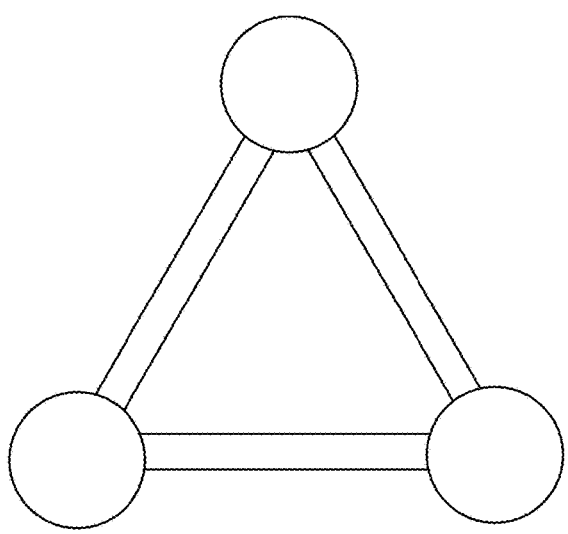
Figure 7A:
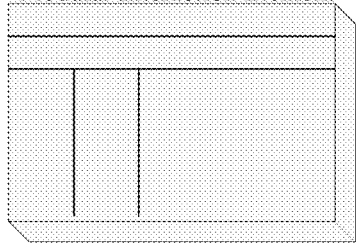
FIGS. 7A and 7B illustrates a real world modular element suitable for use in an immersive environment and the overlay for the object in the simulation according to embodiments of the present disclosure.
Figure 7B:
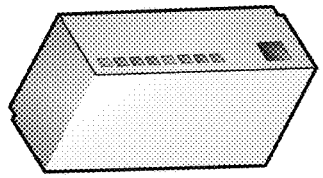

FIG. 6A shows a pod configuration with centrally disposed walls to allow for other interactions. FIG. 6B shows three pods linked together by corridors that can open and shut based on control signals from the server or a user carried computing device in response to movement cues or other trigger signals based on game events. FIG. 7A shows an object, such as foam or wooden mock up. FIG. 7B shows an overlay that can be shown to a user while they are touching the buttons or other surface features of the real object to enhance the simulation experience.

As described above, FIG. 8A shows a user in a pod with a real object and a real actor and FIG. 8B shows the transformation through the simulated display presented to the user such as via a VR headset, helmet or other display or projection technology. The real object shown in FIG. 8A can slide out from the wall in response to a control signal or be placed by the human actor.

Referring to FIG. 9, there is shown a server application 10 for running a simulation and/or synchronizing user actions in the simulation with real world events in a pod or other physical location and pod deployed, physical location deployed, or user computer systems (generally client computing systems) 28, 30, 32, 34. As shown, pods 32 and 34 are in different or the same location with access to different networks. The server application 10 and/or one or more of the client computer systems 28, 30, 32, 34 may execute one or more of the processes configured to carry out one or more of the features described herein relating to a simulation and user generated or tracked data.

The server application 10 may be referred to as a process configured to carry out one or more of the features descried herein, such as user tracking, user monitoring, triggering of sensory stimulating devices, synchronization of real and simulated events, and control of user devices or other devices relevant to the user experience. Further, on or more of the client applications 12, 14, 16, and 18 may be referred to as a process configured to carry out one or more of the features described herein, such as the synchronization of user actions, movement, overlay registration, positional changes, interactions with objects, walls, panels, and surfaces and generation of the simulation such as in a wearable computing device.

Referring to FIG. 9, the Simulation, Synchronization, and Control process 10 may reside and may be executed by a server computer 20, which may be in communication with a network 22 (e.g., the Internet or a local area network). Examples of the server computer 20 include, but are not limited to: a personal computer, a server computer, a series of server computers, a mini computer, and/or a mainframe computer. The server computer 20 may be a distributed system and the operations of the server computer 20 may execute on one or more processors, simultaneously and/or serially. For example, the server computer 20 may be a cloud computing site, cloud environment, or cloud platform running multiple servers, computers, and/or virtual machines (e.g., a virtual machine host computer). The server computer 20 may execute on or more operating systems, examples of which may include but are not limited to Microsoft Windows Server™, Novell Netware™, Redhat Linux™, Unix, or a custom operating system, for example. The server computer 20 can generate a simulation in one embodiment. In another embodiment, the client device generate the simulation and the server computer 20 controls the environmental devices, processes tracking data, or takes other actions. However, any of the actions described herein can be performed by the client or server devices in a given embodiment.

The instruction sets and subroutines of the server-side simulation, synchronization, and control process 10, which may be stored on a storage device 24 coupled to the server computer 20, may be executed by one or more processors (not shown) and one or more memory architectures (not shown) incorporated into the server computer 20. The storage device 24 may include but is not limited to: a hard disk drive; a tape drive; an optical drive; a solid state storage device; a RAID array; a random access memory (RAM); and a read-only memory (ROM).

The server computer 20 may execute a web server application that allows for access to the server computer 20 (via the network 22) using one or more protocols, examples of which may include but are not limited to HTTP (i.e., HyperText Transfer Protocol). The network 22 may be in communication with one or more secondary networks (e.g., a secondary network 26), examples of which may include but are not limited to: a local area network; a wide area network; or an intranet, for example.

The client-side simulation, synchronization, and control processes 12, 14, 16, 18 may reside on and may be executed by client electronic devices 28, 30, 32, 34 (respectively), examples of which may include but are not limited to a personal computer 28, a television with one or more processors embedded therein or coupled thereto (not shown), a laptop computer 30, a data-enabled mobile telephone 32, a notebook computer 34, a tablet (not shown), and a personal digital assistant (not shown), for example. Client electronic devices or location/pod devices 28, 30, 32, 34 may each be in communication with the network 22 and/or secondary network 26 and may each execute an operating system, examples of which may include but are not limited to Apple iOS™, Microsoft Windows™, Android™, Redhat Linux™, or a custom operating system.

The instruction sets and subroutines of the client-side simulation, synchronization, and control processes 12, 14, 16, 18, which may be stored on storage devices 36, 38, 40, 42 (respectively) coupled to the client electronic or location/pod devices 28, 30, 32, 34 (respectively), may be executed by one or more processors (not shown) and one or more memory architectures (not shown) incorporated into the client electronic devices 28, 30, 32, 34 (respectively). Storage devices 36, 38, 40, 42 may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage device, for example.

The client-side simulation, synchronization, and control processes 12, 14, 16, 18 and/or server-side simulation, synchronization, and control process 10 may be processes that run within (i.e., are part of) a cloud computing site, cloud computing application, cloud platform, or cloud environment. Alternatively, the client-side simulation, synchronization, and control processes 12, 14, 16, 18 and/or server-side Simulation, Synchronization, and Control process 10 may be stand-alone applications that work in conjunction with the cloud computing site, cloud computing application, cloud platform, or cloud environment. One or more of the client-side simulation, synchronization, and control processes 12, 14, 16, 18 and server-side simulation, synchronization, and control process 10 may interface with each other (via the network 22 and/or secondary network 26).

Users 44, 46, 48, 50 may access the server-side file simulation, synchronization, and control process 10 directly through the device on which the client-side simulation, synchronization, and control process (e.g., client-side simulation, synchronization, and control processes 12, 14, 16, 18) is executed, namely the client electronic devices 28, 30, 32, 34, for example. The users can also have the simulation running locally and exchange other simulation or positional information with server 20 through process 10. Users 44, 46, 48, 50 may access the server-side simulation, synchronization, and control process 10 directly through the network 22 and/or through the secondary network 26. Further, the server computer 20 (i.e., the computer that executes server-side simulation, synchronization, and control process 10) may be in communication with the network 22 through the secondary network 26, as illustrated by the phantom link 52.

The various client electronic devices may be directly or indirectly coupled to the network 22 (or the secondary network 26). For example, the personal computer 28 is shown directly coupled to the network 22 via a hardwired network connection. Further, the computing device 34 of the pod is shown directly coupled to the network 26 via a hardwired network connection. The laptop computer 30 is shown wirelessly coupled to the network 22 via a wireless communication channel 54 established between the laptop computer 30 and a wireless access point (i.e., WAP) 56, which is shown directly coupled to the network 22. The laptop can provide a local simulation experience with goggles at home or other devices. Thus, although a user may not walk with a laptop, head movement or other data about the user can be tracked and used to change the simulation. The WAP 56 may be, for example, an IEEE 802.11a, 802.11b, 802.11g, 802.11n, Wi-Fi, and/or Bluetooth device that is capable of establishing a wireless communication channel 54 between the laptop computer 30 and the WAP 56. A pod 32 is shown wirelessly coupled to the network 22 via a wireless communication channel 58 established between the pod 32 and a cellular network/bridge 60, which is shown directly coupled to the network 22. A mobile device, tablet, wearable, or other device being used by a user can also connect to the network and server 20 in the same manner to send and receive information useable to carry out the actions described herein relative to the simulation.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

Figure 10:
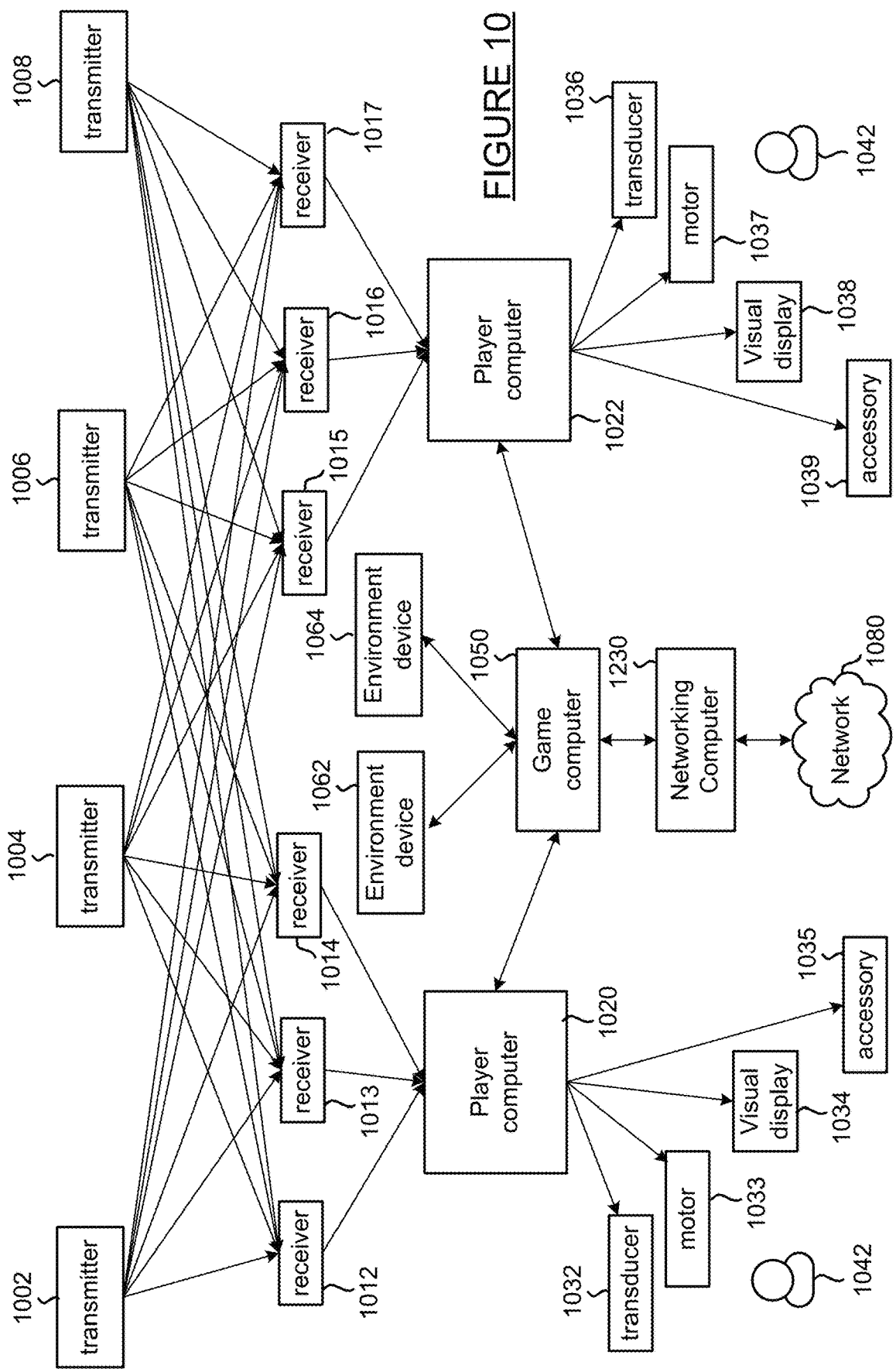
FIG. 10 is a block diagram of a system for providing a gaming environment.

FIG. 10 is a block diagram of a system for providing a gaming environment. The system of FIG. 10 includes transmitters 1002, 1004, 1006 and 1008, receivers 1012, 1013, 1014, 1015, 1016 and 1017, player computers 1020 and 1022, transducers 1032 and 1036, motors 1033 and 1037, virtual display 1034 and 1038, accessories 1035 and 1039, players 1040 and 1042, game computer 1050, environment devices 1062 and 1064, networking computer 1070, and network 1080.

Receivers 1012-1017 may be placed on a player 1040 or an accessory 1035. Each receiver may receive one or more signals from one or more of transmitters 1002-1008. The signals received from each transmitter may include an identifier to identify the particular transmitter. In some instances, each transmitter may transmit an omnidirectional signal periodically at the same point in time. Each receiver may receive signals from multiple transmitters, and each receiver may then provide signal identification information and timestamp information for each received signal to player computer 1020. By determining when each transmitter signal is received from a receiver, player computer 1020 may identify the location of each receiver.

Player computer 1020 may be positioned on a player, such as for example on the back of a vest worn by a player. For example, with respect to FIG. 11, player computer 250 is positioned on a back of a player 1100. A player computer may receive information from a plurality of receivers, determine the location of each receiver, and then locally update a virtual environment accordingly. Updates to the virtual environment may include a player's point of view in the environment, events that occur in the environment, and video and audio output to provide to a player representing the player's point of view in the environment along with the events that occur in the environment.

Player computer 1020 may also communicate changes to the virtual environment determined locally at the computer to other player computers, such as player computer 1022, through game computer 1050. In particular, a player computer for a first player may detect a change in the player's position based on receivers on the player's body, determine changes to the virtual environment for that player, provide those changes to game computer 1050, and game computer 1050 will provide those updates to any other player computers for other players in the same virtual reality session, such as a player associated player computer 1022.

Figure 11:
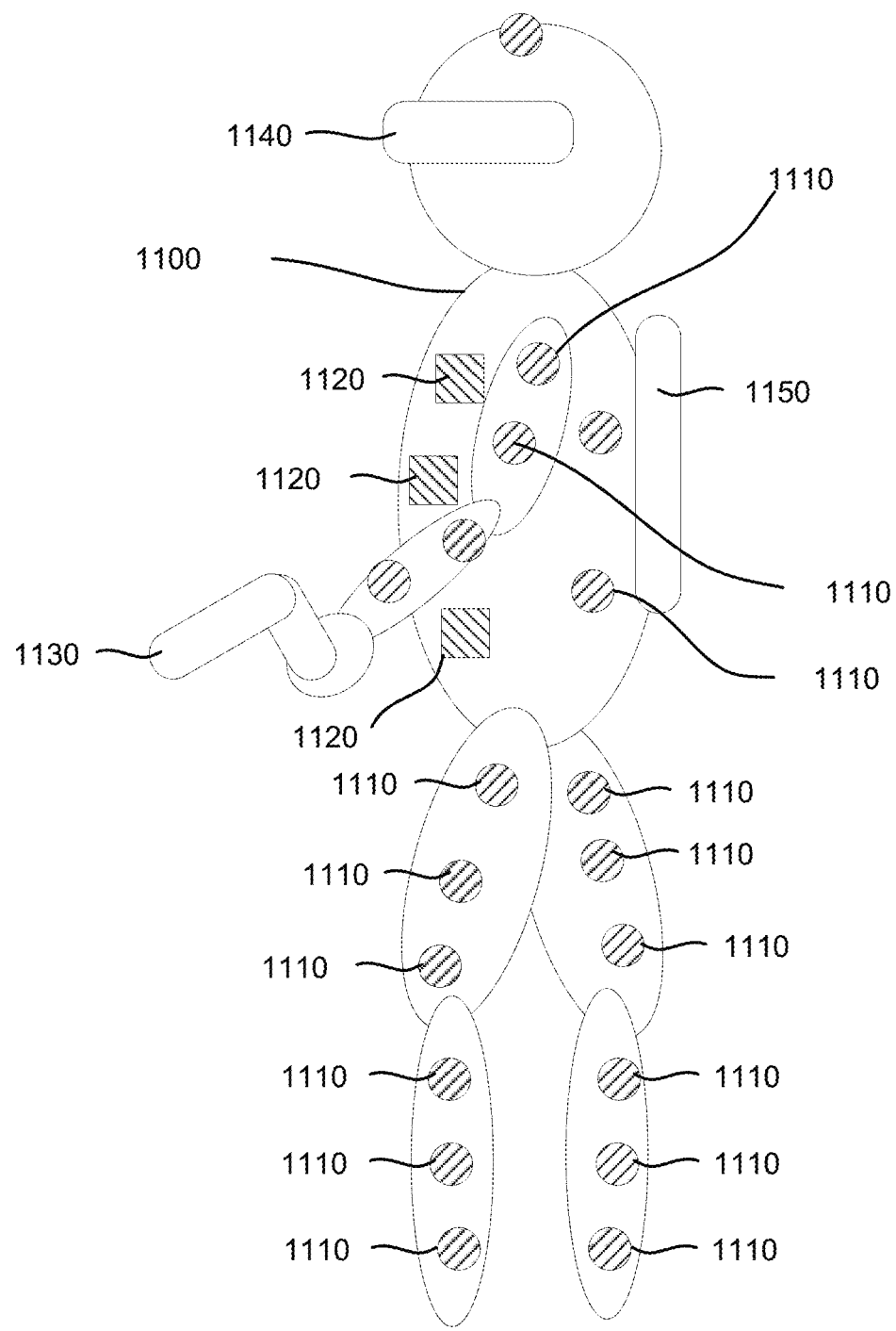
FIG. 11 illustrates a block diagram of a player 1100.

A player 1040 may have multiple receivers on his or her body, as shown in FIG. 11. The receivers receive information from the transmitters and provide that information to the player computer. In some instances, each receiver may provide the data to the player computer wirelessly, such as for example through a radiofrequency signal such as a Bluetooth signal. In some instances, each receive may be paired or otherwise configured to only communicate data with a particular players computer. In some instances, a particular player computer may be configured to only receive data from a particular set of receivers. Based on physical environment events such as a player walking, local virtual events that are provided by the players computer, or remote virtual events triggered by an element of the virtual environment located remotely from the player, haptic feedback may be triggered and sensed by a player. The haptic feedback may be provided in the terms of transducer 1032 and motor 1033. For example, if an animal or object touches a player at a particular location on the player's body within the virtual environment, a transducer located at that position may be activated to provide a haptic sensation of being touched by that object.

Visual display 1034 may be provided through a headset worn by player 1040. The virtual display 1034 may include a helmet, virtual display, and other elements and components needed to provide a visual and audio output to player 1040. In some instances, player computer 1020 may generate and provide virtual environment graphics to a player through the virtual display 1040.

Accessory 1035 may be an element separate from the player, in communication with player computer 1020, and displayed within the virtual environment through visual display 1034. For example, an accessory may include a gun, a torch, a light saber, a wand, or any other object that can be graphically displayed within the virtual environment and physically engaged or interacted with by player 1040. Accessories 1035 may be held by a player 1040, touched by a player 1040, or otherwise engaged in a physical environment and represented within the virtual environment by player computer 1020 through visual display 1034.

Game computer 1050 may communicate with player computers 1020 and 1022 to receive updated virtual information from the player computers and provide that information to other player computers currently active in the virtual reality session. Game computer 1050 may store and execute a virtual reality engine, such as Unity game engine, Leap Motion, Unreal game engine, or another virtual reality engine. Game computer 1050 may also provide virtual environment data to networking computer 1070 and ultimately to other remote locations through network 1080. For example, game computer 1050 may communicate over network 22 in the system of FIG. 9 through network 1080, which may be separate networks or the same network.

Environment devices 1062 may include physical devices part of the physical environment that may interact or be detected by a player 1040 or other aspects of the gaming system. For example, and enter environment device 1062 may be a source of heat, cold, wind, sound, smell, vibration, or some other sense that may be detected by a player 1040.

FIG. 11 is a block diagram of a player 1100. Player 1100 may include a plurality of receivers 1110, a plurality of haptic devices 1120, one or more accessories 1130, visual display 1140, and player computer 1150. As shown, one or more receivers 1120 may be placed in multiple locations over a player's body. In some instances, receivers may be placed on clothing that may be worn or attached to the player. As a virtual session is experienced by the player, the location of each receiver will be determined by player computer 1150 based on signal ID information and timestamp information received by each and every receiver by the player computer 1150. Based on physical environment events, local virtual events, and remote virtual vents, haptic feedback may be provided to a player through one or more haptic devices 1120. Each haptic device 1120 may include one or more transducers or motors positioned on the clothing or otherwise attached to a player in such a way as to provide haptic feedback that can be sensed by the player. Accessory 1130 may be held by a player and may also include one or more receivers and haptic devices, each of which may have a similar functionality as those placed on a player's body. Virtual display 1140 may provide a player with graphic information, textual information, audio information, and other information for the virtual session as provided by player computer.

Figure 12:
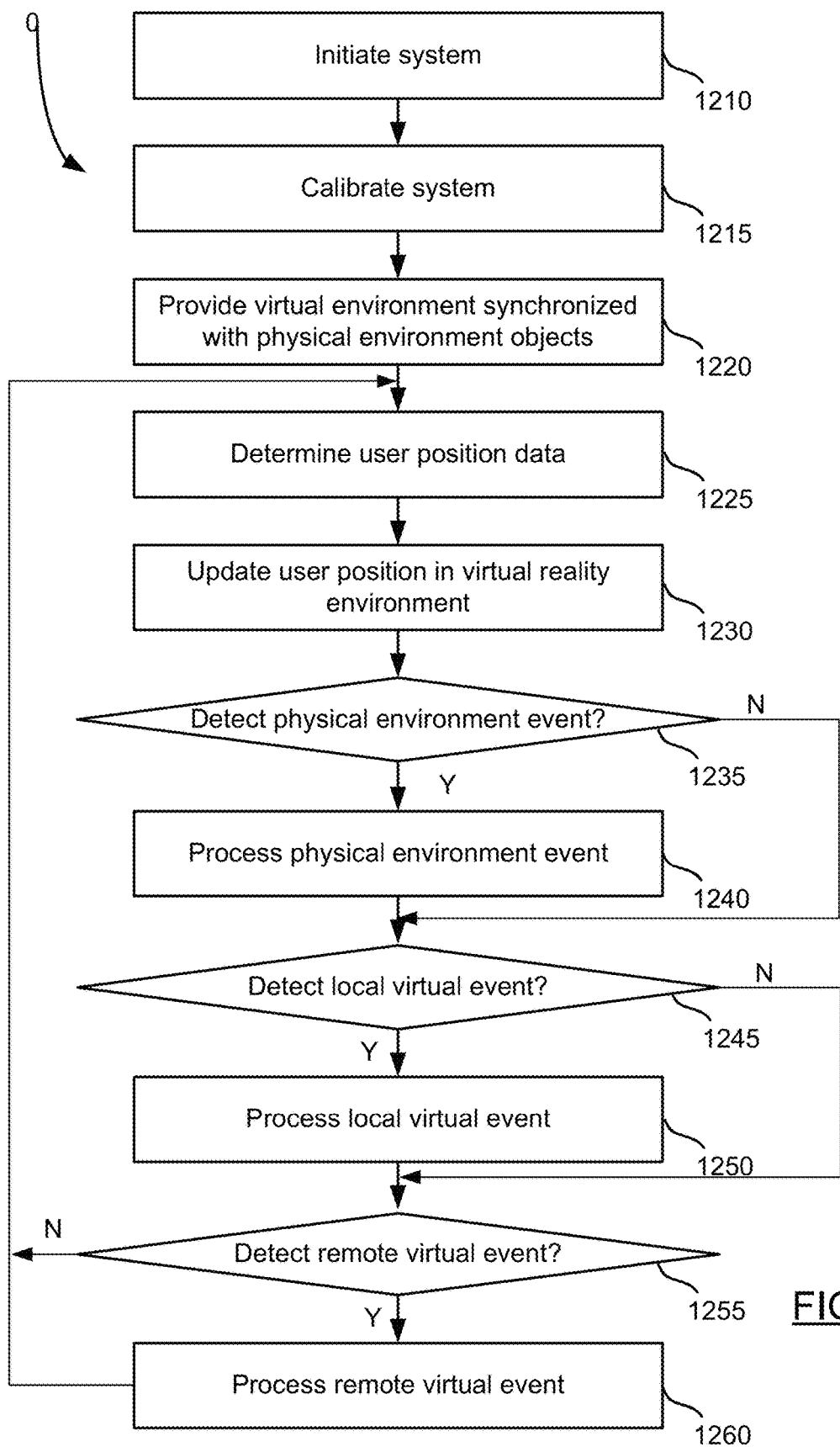
FIG. 12 illustrates a method for providing a virtual session to a player.

FIG. 12 is a method for providing a virtual session to a player. First, the system is initiated at step 1210. System initiation may include turning the various portions of the system on, including the player computers, game computer, environment devices, transmitters, accessories, and other portions of the system. The system may be calibrated at step 1215. Calibrating the system may include aligning several points in a virtual environment with corresponding points in a physical environment. Calibration may also include ensuring that receivers are working with transmitters dispersed throughout the physical environment. After calibration, a virtual environment synchronized with a physical environment is provided at step 1220. Providing the virtual environment in synchronization with the physical environment may include providing gear such as a headset, a player computer, and attaching haptic devices to a player who is to experience the virtual session. Once the player is suited up with these elements, player may proceed through the virtual environment, for example by walking through and making gestures within a physical stage, the virtual environment continually updating through the player's virtual display as a player proceeds through the physical environment that is synchronized with the physical environment.

In some embodiments, before a virtual reality session begins, a player may experience a power-saving mode. This may help save power before the session starts but provide the user with a virtual reality experience while waiting for the fully powered session. The power-saving mode may illustrate reduced detail visual graphics, for example, while waiting for other players in the session to be calibrated or suited up.

As a player makes his or her way through the physical environment associated with the virtual environment, player position data is determined at step 1225. Determining the player position data includes receiving transmitter signals by multiple receivers positioned on the player, and each receiver providing the signal identification information along with timestamp data associated with each receive signal to player computer 1020. The player position in the virtual reality environment is then updated based on the received information at step 1230. Updating includes providing the location data to the virtual reality engine, determining the position of each receiver in the virtual reality environment, modeling the player's updated position based on the receives (which are mapped to user locations through the virtual reality engine), and graphically providing the player's updated position and other environment virtual environment objects based on the player's updated position to the player through the visual display 1034.

A determination is made as to whether a physical environment event is detected at step 1235. The physical environment event may include a player walking, an accessory being engaged by a player, or some other physical event. If no physical environment event is detected, the method of FIG. 12 continues to step 1245. If a physical environment event is detected, the physical environment event is processed at step 1240. Processing the physical environment event is discussed in more detail below with respect to the method of FIG. 13.

A determination is made as to whether a local virtual is detected at step 1245. A local virtual event may include a virtual event triggered and generated on a player's player computer. If a local virtual event is detected, the local virtual event is processed at step 1250. Processing of a local virtual that is discussed in more detail below with respect to the method of FIG. 14. If no local virtual event is detected, the method of FIG. 12 continues to step 1255. A determination is made as to whether a remote virtual event is detected at step 1255. A remote virtual event is an event detected away from the player, such as for example by a different player the same virtual reality session and located at a remote location from the present player. If no remote virtual event is detected, the method of FIG. 12 returns to step 1225 in order to continue providing the virtual session. If a remote virtual event is detected, the remote virtual event may be processed at step 1260 and the method continues to step 1225. Processing a remote virtual that is discussed in more detail below with respect to the method of FIG. 15.

Figure 13:
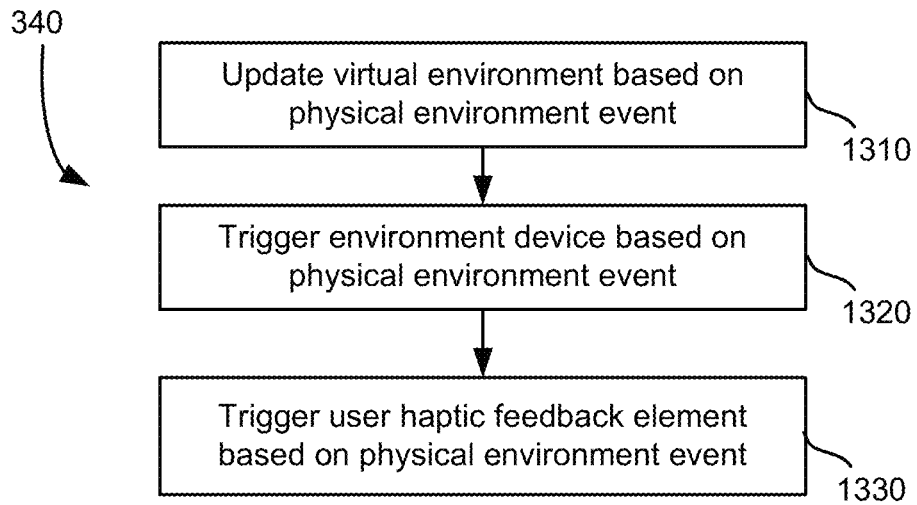
FIG. 13 illustrates a method for processing a physical environment event.

FIG. 13 provides a method for processing a physical environment event. The method of FIG. 13 provides more detail for step 1235 the method of FIG. 12. First, a virtual environment is updated based on the physical environment event at step 410. The virtual environment may be updated to provide graphical output or audio output generated in the virtual reality session. For example, if another player opens a door within a physical environment associated with the virtual environment, the sound of the door opening may be provided to the player and the graphics of the particular door may be provided to the player. Environmental devices may also be triggered based on the physical environment event at step 420. For example, if a player walks by what is depicted as an open window within a virtual environment event, a wind source at that particular physical location may be engaged to provide wind against the player as player passes the window in the virtual environment. Haptic feedback elements may be triggered based on the physical environment at step 430. For example, if a player touches an element in the virtual environment which is configured to touch the player back, a haptic device on the player may provide the sensation at the particular point where a player is being touched.

Figure 14:
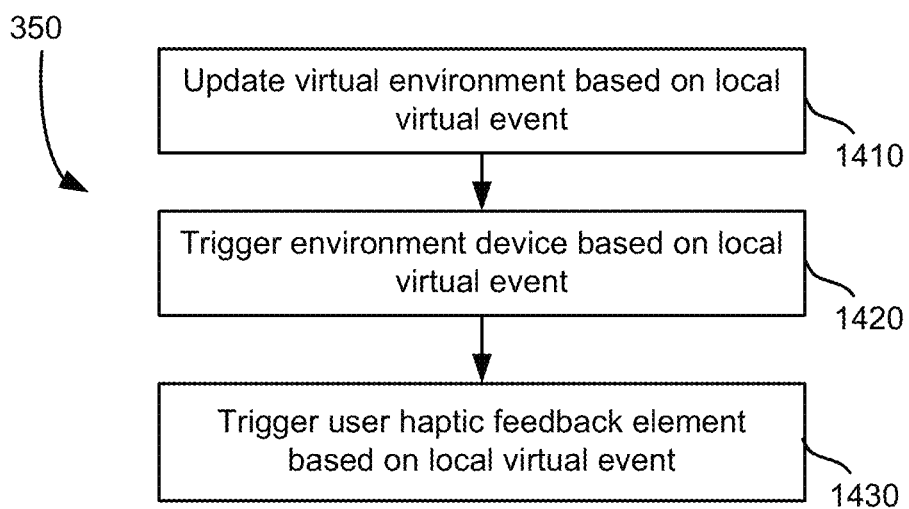
FIG. 14 illustrates a method for processing a local virtual event.

FIG. 14 is a method for processing a local virtual event. The method of FIG. 14 provides more detail for step 1250 the method of FIG. 12. First, a virtual environment is updated based on the local virtual that at step 510. For example, when a player opens a door, the inside appearance of the door may be provided to the player through a graphical interface in the virtual environment. An environment device may be triggered based on the local virtual event at step 520. For example, if a fire starts in the virtual environment, a heat source device may be triggered to provide heat at the location where the fire is burning within the virtual reality environment. Player haptic feedback elements may be triggered based on the local virtual at step 530. For example, if a virtual alien shoots a laser gun at a player, the haptic feedback element may be triggered at a point at which the laser hits the player.

Figure 15:
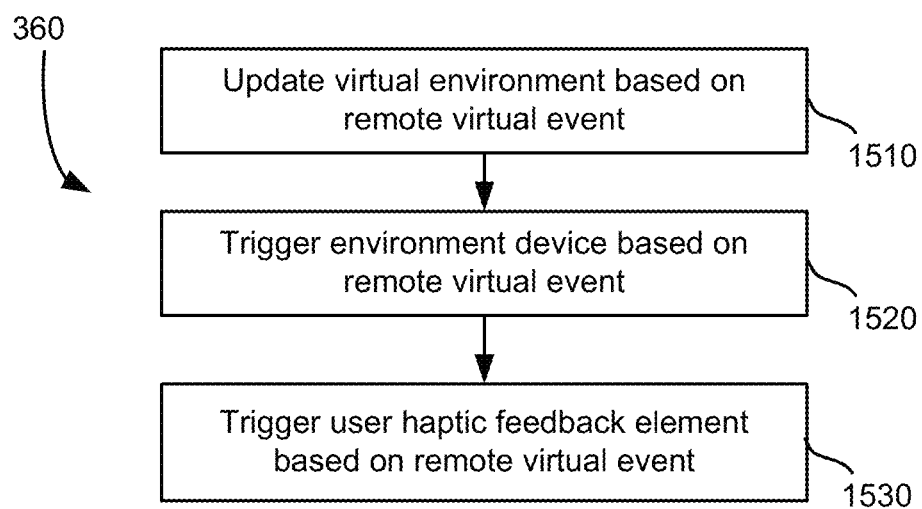
FIG. 15 illustrates a method for processing remote virtual events.

FIG. 15 is a method for processing remote virtual events. The method of FIG. 15 provides more detail for step 1260 the method of FIG. 12. First, a virtual environment may be updated based on the remote virtual event at step 510. For example, if a remote player shoots an alien, the virtual environment provided to a current player through the current player's visual display may be updated to show the actions by the remote player as well as the alien being shot. An environment device is triggered based on the remote virtual event at step 520. For example if a remote player lights a fire, and environment device that provides heat may be triggered to provide heat to the current player based on remote virtual event at step 520. Player haptic feedback may be triggered based on the remote virtual event at step 530. For example, if a player located at a different physical facility taps a virtual representation of the current player playing at the current facility, haptic feedback placed on the local player may be triggered to provide the sensation of a touch on the local player at the position at which the remote player touched the local player.

Figure 16:
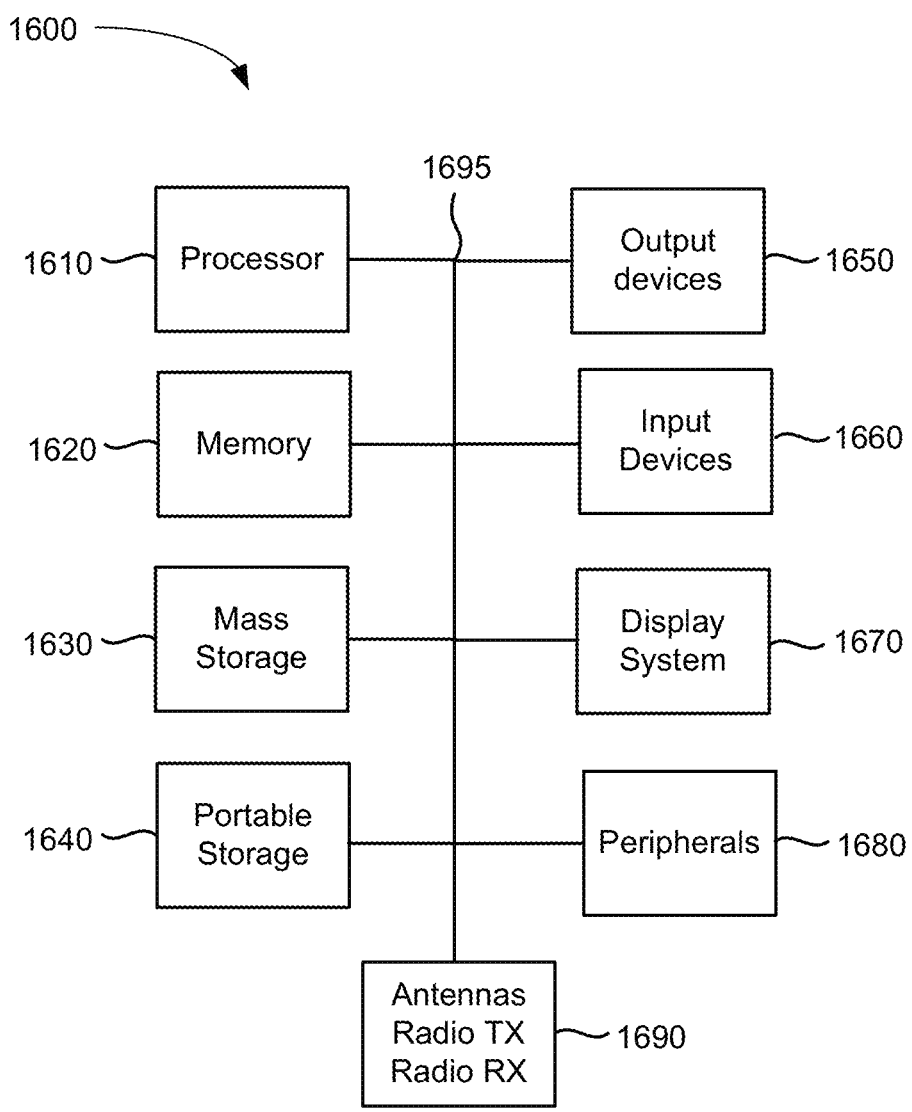
FIG. 16 illustrates a block diagram of a system for implementing the present technology.

FIG. 16 is a block diagram of a system for implementing the present technology. System 1600 of FIG. 16 may be implemented in the contexts of the likes of computing devices discussed herein. The computing system 1600 of FIG. 16 includes one or more processors 1610 and memory 1620. Main memory 1620 stores, in part, instructions and data for execution by processor 1610. Main memory 1620 can store the executable code when in operation. The system 1600 of FIG. 16 further includes a mass storage device 1630, portable storage medium drive(s) 1640, output devices 1650, user input devices 1660, a graphics display 1670, and peripheral devices 1680.

The components shown in FIG. 16 are depicted as being connected via a single bus 1690. However, the components may be connected through one or more data transport means. For example, processor unit 1610 and main memory 1620 may be connected via a local microprocessor bus, and the mass storage device 1630, peripheral device(s) 1680, portable storage device 1640, and display system 1670 may be connected via one or more input/output (I/O) buses.

Mass storage device 1630, which may be implemented with a magnetic disk drive, an optical disk drive, a flash drive, or other device, is a non-volatile storage device for storing data and instructions for use by processor unit 1610. Mass storage device 1630 can store the system software for implementing embodiments of the present invention for purposes of loading that software into main memory 1620.

Portable storage device 1640 operates in conjunction with a portable non-volatile storage medium, such as a floppy disk, compact disk or Digital video disc, USB drive, memory card or stick, or other portable or removable memory, to input and output data and code to and from the computer system 1600 of FIG. 16. The system software for implementing embodiments of the present invention may be stored on such a portable medium and input to the computer system 1600 via the portable storage device 1640.

Input devices 1660 provide a portion of a user interface. Input devices 1660 may include an alpha-numeric keypad, such as a keyboard, for inputting alpha-numeric and other information, a pointing device such as a mouse, a trackball, stylus, cursor direction keys, microphone, touch-screen, accelerometer, and other input devices Additionally, the system 1600 as shown in FIG. 16 includes output devices 1650. Examples of suitable output devices include speakers, printers, network interfaces, and monitors.

Display system 1670 may include a liquid crystal display (LCD) or other suitable display device. Display system 1670 receives textual and graphical information, and processes the information for output to the display device. Display system 1670 may also receive input as a touch-screen.

Peripherals 1680 may include any type of computer support device to add additional functionality to the computer system. For example, peripheral device(s) 1680 may include a modem or a router, printer, and other device.

The system of 1600 may also include, in some implementations, antennas, radio transmitters and radio receivers 1690. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth devices, and other radio frequency networks. The devices may include one or more radio transmitters and receivers for processing signals sent and received using the antennas.

The components contained in the computer system 1600 of FIG. 16 are those typically found in computer systems that may be suitable for use with embodiments of the present invention and are intended to represent a broad category of such computer components that are well known in the art. Thus, the computer system 1600 of FIG. 16 can be a personal computer, hand held computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, iOS, Android, C, C++, Node.JS, and other suitable operating systems.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof. Software can be hosted and deployed at a pod or via a wearable or streamed to the foregoing, as an example.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application and/or in a similar manner and may provide various functionality of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," "computing device" or "processor" may be, for example and without limitation, a processor, microcomputer, minicomputer, server, mainframe, laptop, personal data assistant (PDA), wireless e-mail device, cellular phone, pager, processor, watch, wearable device, backpack, VR goggles, projector, tracking device, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "simulation," "gaming platform," "tracking system", "triggering system", "synchronization system," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, tracking user actions at different locations, prioritizing and scheduling tasks based on network demand, and/or prioritizing certain user actions during critical simulation events and other actions.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. The software can be disposed in a wearable computing device or in a server or in a mobile device. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network. As a result, users in stacked or otherwise connected arrays of pods and be linked together whether in the same or separate geographic regions.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. This technology can be configured to reduce the bandwidth by constraining the set of data needed to trigger a real world sensory device or otherwise track user position. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation.

A network bridge can be configured to connect multiple network segments at the data link layer of a computer network while learning which addresses can be reached through which specific ports of the network. One or more users can be engaged in individual instances of a simulation or a common instances. In one embodiment, N users in N pods are able to participate in a simulation such as a game or adventure separately or simultaneously. The N users can be on separate networks or a common network. In one embodiment, the N users access one or more networks and computing devices to simulate the platform using a wearable device or their own mobile device such as a tablet or smart phone. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets. In one embodiment, the datasets generated in responsive to or otherwise descriptive of user interactions are configured such that normal wireless network traffic can handle the relevant datasets. High volume datasets such as those from optical tracking of user movement are avoided and magnetic signals or electrical signals are used to affect user tracking and synchronization and triggering of events in a pod or other location.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. Various types of optical, projection, non-contact motion detection, wireless control, and other technologies relating to simulations, the display thereof, and synchronizing interactions and movement in a pod or other locations can be used in conjunction with the software and hardware described herein.

Implementations of the present disclosure can be realized in a computer system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computer system can include clients and servers. A client and server are generally remote from each other and typically interact through a communication network. The relationship of client and server arises by virtue of computer programs running on the respective computers and having a client-server relationship to each other.

Reference throughout this specification to "one embodiment" or "an embodiment" indicates that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. In particular, an "embodiment" may be a system, an article of manufacture (such as a computer readable storage medium), a method, and/or a product of a process.

The phrases "connected to," "networked," and "in communication with" refer to any form of interaction between two or more entities, including mechanical, electrical, magnetic, and electromagnetic interaction. Two components may be connected to each other, even though they are not in direct physical contact with each other and even though there may be intermediary devices between the two components.

Some of the infrastructure that can be used with embodiments disclosed herein are already available, such as: general-purpose computers, computer programming tools and techniques, digital storage media, and optical networks. A computer may include a processor such as a microprocessor, microcontroller, logic circuitry, or the like. The processor may include a special purpose processing device such as an ASIC, GPU, PAL, PLA, PLD, Field Programmable Gate Array, or other customized or programmable device. The computer may also include a computer readable storage device such as: non-volatile memory, static RAM, dynamic RAM, ROM, CD-ROM, disk, tape, magnetic, optical, flash memory, or other computer readable storage medium. Graphic processors can also be used as part of the computing devices to render simulated environments.

The described features, operations, or characteristics may be combined in any suitable manner in one or more embodiments. It will also be readily understood that the order of the steps or actions of the methods described in connection with the embodiments disclosed herein may be changed, as would be apparent to those skilled in the art. Thus, any order in the drawings or detailed description is for illustrative purposes only and is not meant to imply a required order, unless specified to require an order. In the following description, numerous details are provided to give a thorough understanding of various embodiments. One skilled in the relevant art will recognize, however, that the embodiments disclosed herein can be practiced without one or more of the specific details, or with other methods, components, materials, etc. In other instances, well-known structures, materials, or operations are not shown or described in detail to avoid obscuring aspects of this disclosure.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed:

1. An immersive simulation system for providing a combined virtual and physical environment for a plurality of users, the system comprising:
    a pod in which a first user and a second user are each experiencing a respective virtual environment, the pod comprising:
        a plurality of panels defining one or more interaction zones for the first user and the second user,
        a portal sized to permit the first user and the second user to enter the pod,
        a tracking system including a plurality of transmitters within the pod, and one or more sensory system stimulating devices, wherein activation of the one or more sensory stimulating devices is synchronized with one or more events in a simulation running on one or more computing devices;
    a first computing device positioned on the first user, wherein the first computing device receives information from a plurality of receivers placed on the first user, wherein at least one receiver of the plurality of receivers receives signals from at least one transmitter of the plurality of transmitters, and wherein the first computing device positioned on the first user updates a virtual environment for the first user based on information derived from the received signals;
    a headset positioned on the first user, wherein the headset is in communication with the first computing device, the headset providing visual output to the first user based on the updated virtual environment for the first user;
    a second computing device positioned on the second user and that receives information from a second plurality of receivers placed on the second user, the computing device on the second user configured to update a virtual environment for the second user based on the received information; and
    a server in communication, over a network, with the first computing device and the second computing device, wherein the server:
        receives virtual environment update data from the first computing device corresponding to the updated virtual environment for the first user, updates the virtual environment for the second user based on the virtual environment update data,
        transmits data regarding the updated virtual environment for the second user to the second computing device positioned on the second user,
        determines, at a first point in time, that the first computing device is outside of an area surrounding a physical character in the pod,
        responsive to determining that the first computing device is outside of the area, transmits, to the first computing device, first data representing a virtual representation of the physical character in the virtual environment for the first user, wherein generation of the first data is controlled by the server,
        determines, at a second point in time, that the first computing device has moved from outside of the area surrounding the physical character to inside of the area surrounding the physical character, and
        responsive to determining that the first computing device has moved from outside of the area surrounding the physical character to inside of the area surrounding the physical character, (i) transmits, to a third computing device positioned on the physical character virtual environment data for the first user such that the third computing device enables the physical character to interact with the first user based on the virtual environment for the first user, and (ii) causes the first computing device to present, in the virtual environment for the first user, a transformed depiction of the physical character.

2. The immersive simulation system of claim 1, wherein the server further updates the virtual environment for the first user based on a physical environment event.

3. The immersive simulation system of claim 2, wherein the server triggers an environment device based on the physical environment event.

4. The immersive simulation system of claim 2, wherein the server triggers a user haptic feedback element based on the physical environment event.

5. The immersive simulation system of claim 1, wherein the server updates the virtual environment for the first user based on a local virtual event.

6. The immersive simulation system of claim 5, wherein the server triggers a user haptic feedback element based on the local virtual event.

7. The immersive simulation system of claim 1, wherein the server updates the virtual environment for the first user based on a remote virtual event.

8. The immersive simulation system of claim 1, wherein the second computing device receives transmitting data regarding the updated virtual environment for the first user from the server, the second computing device updating the virtual environment for the second user based on the received data and providing output data to a second headset for the second user, the output data providing visual output to the second user based on updated virtual environment for the second user.

* * * * *